United States Patent [19]
Green

[11] Patent Number: 5,192,010
[45] Date of Patent: Mar. 9, 1993

[54] LOAD SUPPORTING DEVICE USEFUL AS A FISH STRINGER

[76] Inventor: William J. Green, 3821 Barbara Way, Salt Lake City, Utah 84124

[21] Appl. No.: 723,748

[22] Filed: Jul. 1, 1991

[51] Int. Cl.$^5$ ............................................... A01K 65/00
[52] U.S. Cl. ......................................... 224/103; 43/55
[58] Field of Search ................ 43/4, 55; 224/103, 920

[56] References Cited

U.S. PATENT DOCUMENTS

| | | | |
|---|---|---|---|
| 597,016 | 1/1898 | Parker | 224/103 |
| 1,212,087 | 1/1917 | Mikell | 224/103 |
| 3,072,307 | 1/1963 | Shook | 224/103 |
| 3,098,592 | 7/1963 | Eisman | 224/103 |
| 3,161,334 | 12/1964 | Baggett | 224/103 |
| 3,263,879 | 8/1966 | Sanderson | 224/103 |

Primary Examiner—Kurt C. Rowan
Attorney, Agent, or Firm—M. Ralph Shaffer

[57] ABSTRACT

A transportable load supporting structure such as a fish stringer having an essentially vertical carrier arm provided with attachment structure and a receiver arm, preferably having a blunted receiver end, and which is upwardly canted with respect to, crossing, and being partially twisted about said carrier arm at an openable junction area. A depending load-supporting receiver loop integrally connects said arms. A load such a fish is received by said receiver arm and descends under the force of gravity toward and opens said junction area, twisting about said junction area, to descend onto said receiver loop to be supported thereby at essentially the bottom thereof.

5 Claims, 3 Drawing Sheets

LOAD SUPPORTING DEVICE USEFUL AS A FISH STRINGER

BACKGROUND OF THE INVENTION
TECHNICAL FIELD
FIELD OF INVENTION

This invention relates to a load-supporting device such as a fishing utility device and, more particularly, to a stringer for holding freshly caught fish in the field while fishing or for transporting and carrying the fish from the field.

BACKGROUND OF INVENTION

Fish stringers are one of the most popular ways used by fishermen to hold and store freshly caught fish. One type consists of a length of small diameter cord to which a small hoop is attached at one end and a pointed shank or needle is attached to the other end. The shank is threaded through the gill of the first fish caught and then passed through the hoop to secure the fish. The shank end is then tied to a boat, belt, dock or any secure attachment close to the water to hold and suspend the fish in the water. As each subsequent fish is caught, the stringer is untied and the next fish is again threaded through the shank and a knot is tied again and the fish are again lowered into the water. This type of stringer requires two hands to operate and entails troublesome tying and untying of knots. Another type of stringer consists of a length of chain with metal clips attached to the chain. This device requires all the fish to be lifted out of the water as another fish is added to the stringer and requires the use of two hands with great difficulty to open the clips, place the fish on the clip and re-clip. This device is very noisy and tends to scratch and mar the side of boats. This device is also notorious for tangling and fouling up with other fishing gear. Both devices require the use of two hands and are cumbersome to use in the field.

As noted before, fish stringers are old in the art as exemplified for example by U.S. Pat. Nos. 2,453,381; 2,518,541; 2,563.480 and 4,308,643. A releasably held fish stringer can be seen in U.S. Pat No. 2,950,888; while U.S. Pat No. 3,550,823, shows a fish stringer attached to the belt of a fisherman. However, none of the prior art anticipates the specific device of the present invention nor renders the details thereof obvious, as will be apparent hereinafter. The device of the present invention is intended to overcome some of the problems of the previous devices noted before and the present invention provides a fish stringer device that is more effective to use, easier to use and less harmful to the fish and the fisherman.

SUMMARY OF THE INVENTION

This invention features load-supporting device such as a fish stringer having a receiving arm through which the fish gills are placed and the receiving arm exits through the mouth of the fish. Once on the receiver arm the fish slides down the receiver arm by gravity until reaching the neck of the receiver arm then the weight of the fish activates the cam loop at the neck of the loop and rocks the neck of the loop open and twists the fish around and down the loop to the loop aperture to securely hold and carry the fish. This invention also has a carrier clip at the top of the stringer to hang from a belt, float tube, boat or other form of attachment. Because of the unique design of this fish stringer additional fish can be added to the stringer with out removing the stringer from its means of attachment; further, the operation can be easily carried out with only one hand. Once the fish is on the stringer the cam loop returns to the orginal sprung position ready to accept the next fish automatically. While easily sliding on each time a fish is placed upon the receiver arm, once the fish are secure on the loop aperture they can not come back off the opposite way until the neck of the stringer is untwisted by the fisherman and the catch is dumped out. In addition to the ease of use and one hand operation, the fish can go onto the stringer without first having to remove the hook. Once the fish is securely on the aperture loop, then the hook can be removed without the possiblity of losing the fish and this is especially useful to float tube fisherman while dancing in the water with their rod in one hand and their other on the fish, the fish goes on the cam loop fish stringer and then with a free hand the angler can remove the hook without dropping the fish back into the water.

Because the present invention requires no strength or skill to use, women, children, physically impaired or the novice can easily use this device. The mere weight of the fish and the action of gravity coupled with the action of the cam loop to open and close the neck of the stringer cause it to operate flawlessly.

The present invention also features a receiver protective loop at the tip of the receiver arm that is safer for the fisherman and less harmful to the fish. Compared to the sharp point of older type stringer needle shafts or clip type pointed tips, this present invention protects the user and limits damage to the fish gills so that the fish can remain alive and healthy while in the water. The protective tips also reduces snagging on clothing or fouling with other fishing gear. The protective tip provides for more humane treatment of the fish and fresher fish.

The present invention is best made from high tensile carbon steel wire but may be mad from any other materials with high tensile strength and the ability to spring back to the orginal configuration. Also the present invention is sized to hold trout or other similarly sized fish; however, the device may be scaled up to hold larger, ocean fish or any object that can be picked up and lifted then carried by the loop. Even in the construction industry using a large crane, the device herein device can safely lift without dropping heavy loads. As before, the receiver arm catches a load and as the load is lifted, the load slides down the receiver arm until it activates the cam loop at the neck of the device, then rocks the load and twists it around the neck of the loop and the load slides down to the loop aperture to be carried to the desired location then upon releasing the weight and twisting open the neck of the loop aperture the load can be safely removed. In a much smaller configuration the cam loop device also works well as a key ring holder. The belt loop holds the carrier to the wearer and key rings are placed upon the receiver arm, then down the arm to activate the cam loop which opens and rocks then twists the key ring around the loop neck and down to the loop aperture. From this position keys can be used without removing them from the belt or other holder and remain on the cam loop stringer and can not fall off and be lost unless the neck is twisted open and the keys then can be easily removed.

OBJECTS

A principal object is to provide a new and useful load supporting device.

A further object is to provide a unitary load supporting device of resilient nature wherein arms upwardly extending from a load supporting loop are crossed and preferably partially twisted, upper extremities thereof defining an insertion extremity and also an attachment extremity, respectively, and whereby loads such as fish, for example, can be received by the insertion extremity and under the force of gravity or otherwise, self-open or spread the juncture proximate the overlap or twist area of the device to descend at the storage area proximate the bottom of the loop.

An additional object is to provide a new and improved fish stringer suitable for easily receiving and also dumping fish, this with but minimal manual manipulation as to the latter function.

Other advantages of this invention will be apparent from the description which follows in conjunction with accompanying drawings and their descriptions and the claims.

DETAILED DESCRIPTION OF THE DRAWINGS

Figure 1:
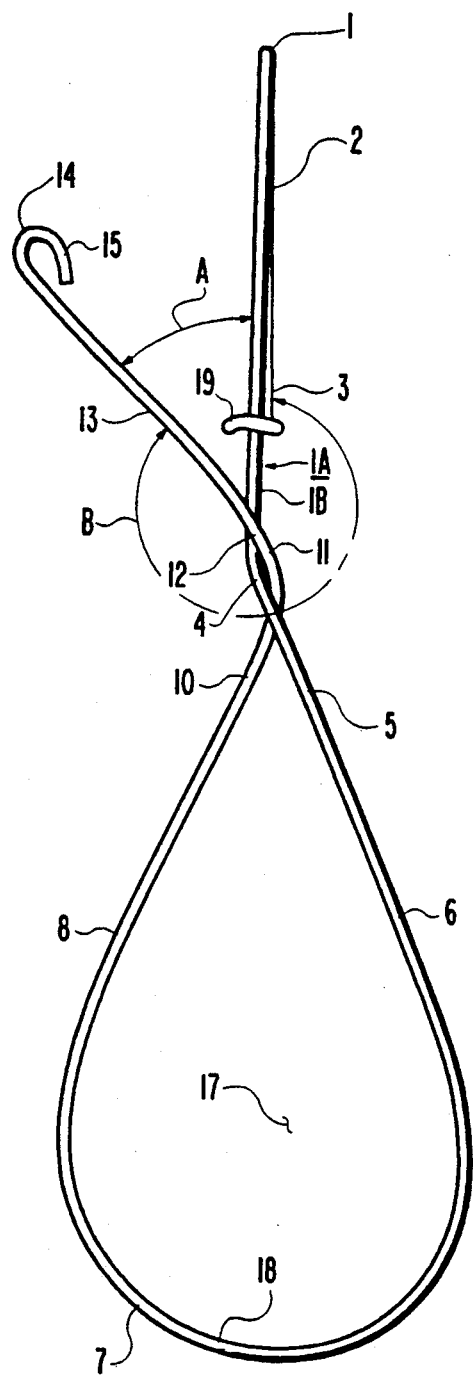
FIG. 1 is a perspective view of the present invention from the right hand side of the fisherman showing the receiver arm, the acute angle at which it meets the carrier cam loop, the receiving neck of the loop and the loop aperture.

As shown in FIG. 1, the cam loop fish stringer, generally referred to as No. 18, has a carrier 1A provided a carrier top 1 and carrier clip 2 providing depending carrier arm 1B and which is removably attached by the carrier clasp hook 19. The cam loop 4 is within the camber of receiver neck 11 to force the spring wire receiver arm 13 and neck open to receive the fish which rocks open the receiver neck and twists the fish around and down the loop 8 of the receiver loop 7 to rest on the receiver loop aperture 17. The terms "cam loop" and "cam loop portion" (11) have been used since it is this curved, cam loop reaction portion which coacts with the descending fish whereby to open the neck of the support receiver loop. The stringer fish gill receiver point 14 is curved as shown and enters through the gill point and out the mouth of the fish. In operation the fish then slides down the receiver arm 13 until it hits the receiver/carrier junction or junction point 12; then the weight of the fish striking the cam loop 4 forces the receiver neck 11 to open and the combination of the camber of the receiver arm junction 12 and the receiver neck 11, rocks then twists the fish around and down the start of the receiver loop 10 and the fish then slides to the bottom of the receiver loop 7. Note is also made of the acute angle A which shows the receiver arm at the 10 o'clock position at an angle of approximately 40 degrees, by way of example, between the receiver arm 13 and the carrier clip 2, resulting in obtuse angle B which is therefore approximately 320 degrees between the carrier clip 2 and the receiver arm 13 in an external clockwise rotation. Also shown is the receiver protective loop 15 which provides for a round tip which is safer for the angler and less harmful and more humane for the fish. Also shown is the carrier loop return 6 and the carrier loop neck 5 which stops the fish from coming off the receiver loop aperture 17 unless the neck 11 is untwisted and the fish retrieved, i.e. dumped off.

Figure 2:
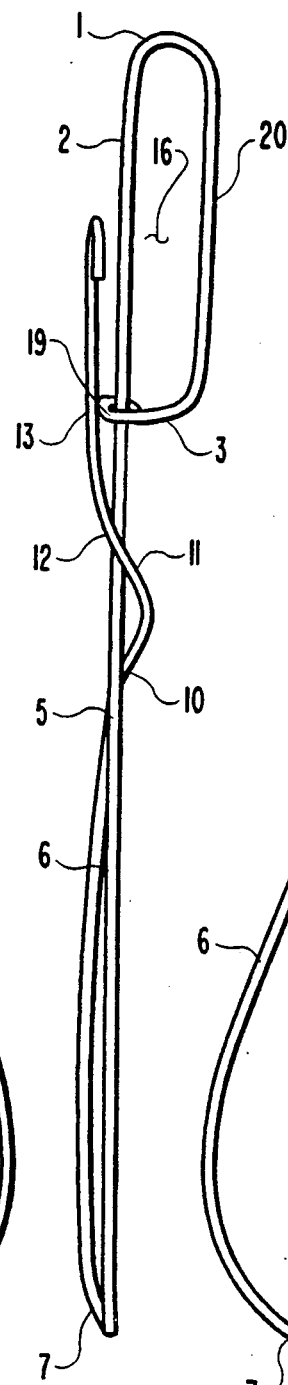
FIG. 2 is a side view, taken along the line 2—2, of the device rotated 90 counter-clockwise, to show the side view of the present invention. This view shows the carrier aperture, the carrier loop and the carrier clasp hook.

As shown in FIG. 2, a side view is depicted which shows the top of the carrier 1 which supports the carrier from a belt, float tube, boat or any other support object to which it can be attached. The carrier loop 20 and the carrier loop bend 3 are integral with carrier clasp hook 19. The carrier clasp hook 19 is detachable to open the carrier aperture 16 to accept a belt, rope or any attachment device. The carrier clasp hook 19 can then be re-hooked to the carrier to securely hold the catch. FIG. 2 also shows the twist in the receiver arm 13 and the junction point 12 of the carrier, also the beginning of the receiver loop 10 and the carrier loop neck 5.

Figure 3:
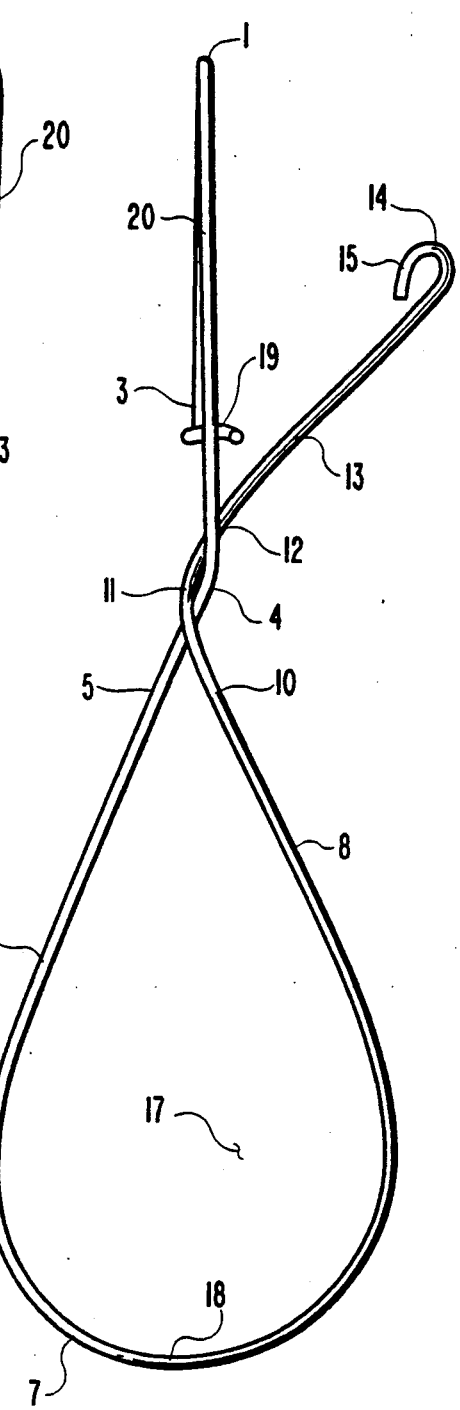
FIG. 3 is a perspective rear view from the reverse side of FIG. 1 and shows the opposite side of the present invention. (NOTE: the mirror image of the present invention is not shown but operates the same way and would be prefered by left-handed fishermen).

As shown in FIG. 3, the reverse side of the cam loop fish stringer is depicted and which shows the top of the carrier 1, the carrier loop 20 with the carrier loop bend 3 and the carrier clasp hook 19 which prevents the carrier from opening until the carrier loop 20 is depressed and the presure is released from the clasp hook 19. Again the fish gill receiver tip 14 and the receiver protective loop 15 are shown. The receiver arm 13 twists around the cam loop 4 at the receiver neck 11 to the start of the receiver loop 10 and down the receiver loop 8 to the bottom of the receiver loop portion 7.

Figure 4:
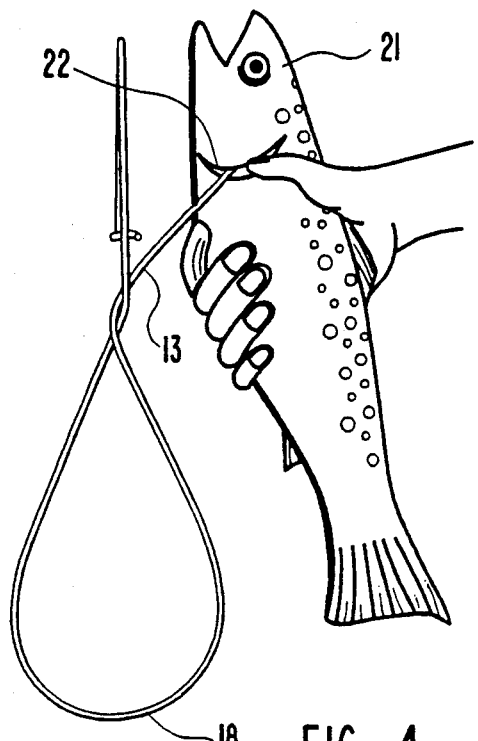
FIG. 4. is a front elevation, constituting a pictorial representation of a fish being placed on the receiver arm of the cam loop fish stringer device.

As shown in FIG. 4, the pictorial representation is shown of a fish 21 being placed upon the receiver arm 13. The receiver arm 13 enters the fish gill 22 and is ready to slide down the cam loop fish stringer 18.

Figure 5:
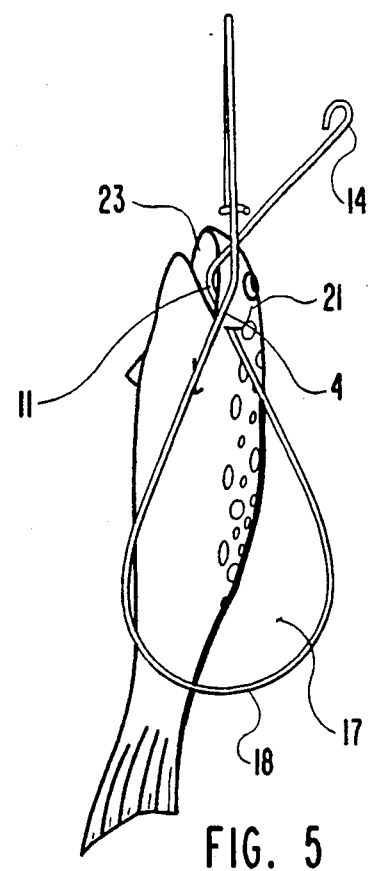
FIG. 5. is front elevation, constituting progressive pictorial representation from FIG. 4 that illustrates the fish sliding down the receiver arm, activating the cam loop, rocking then twisting around the neck of the loop.

As shown in FIG. 5, a progressive pictorial representation of a fish 21 sliding down the fish gill 22 receiver point 14 through the fish's mouth 23. The fish 21 slides past the fish gill receiver point 14 then down to the cam loop 4, and the weight of the fish under the force of gravity pushes the receiver neck 11 open and the cam loop 4 rocks then twists the fish 21 around the receiver neck 11.

Figure 6:
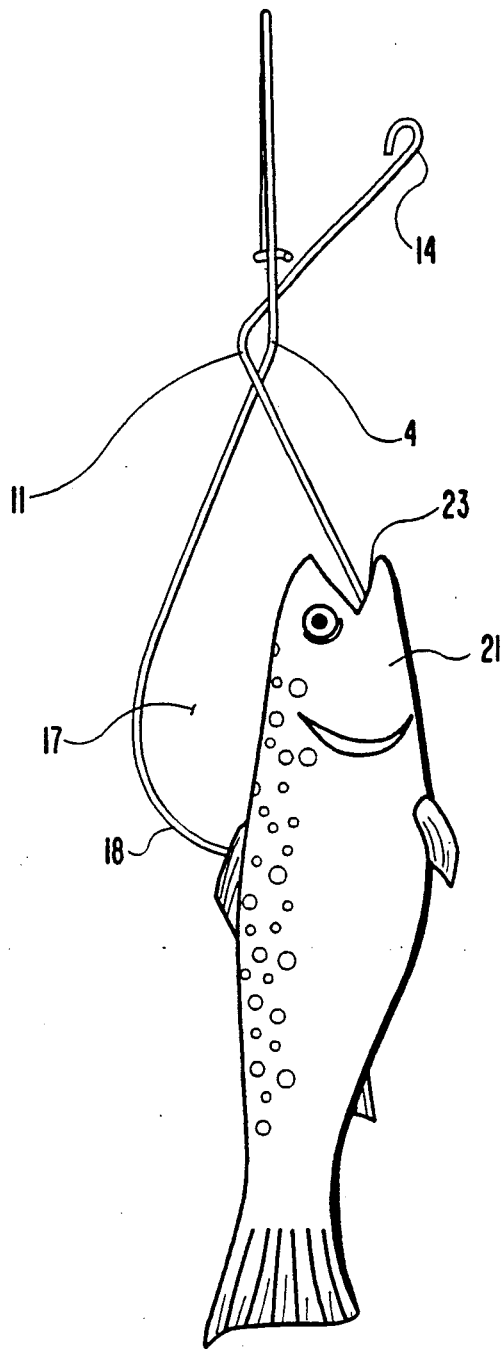
FIG. 6. is a front elevation, the same being a progressive pictorial representation relating to FIGS. 4 and 5 that illustrates the fish having been twisted around, sliding down the loop.

As shown in FIG. 6, a progressive pictorial representation is the third stage in the sequence of the fish 21 having slid past the cam loop 4 and the receiver neck 11, thus falling down fish stringer 18 to the receiver aperture 17.

Figure 7:
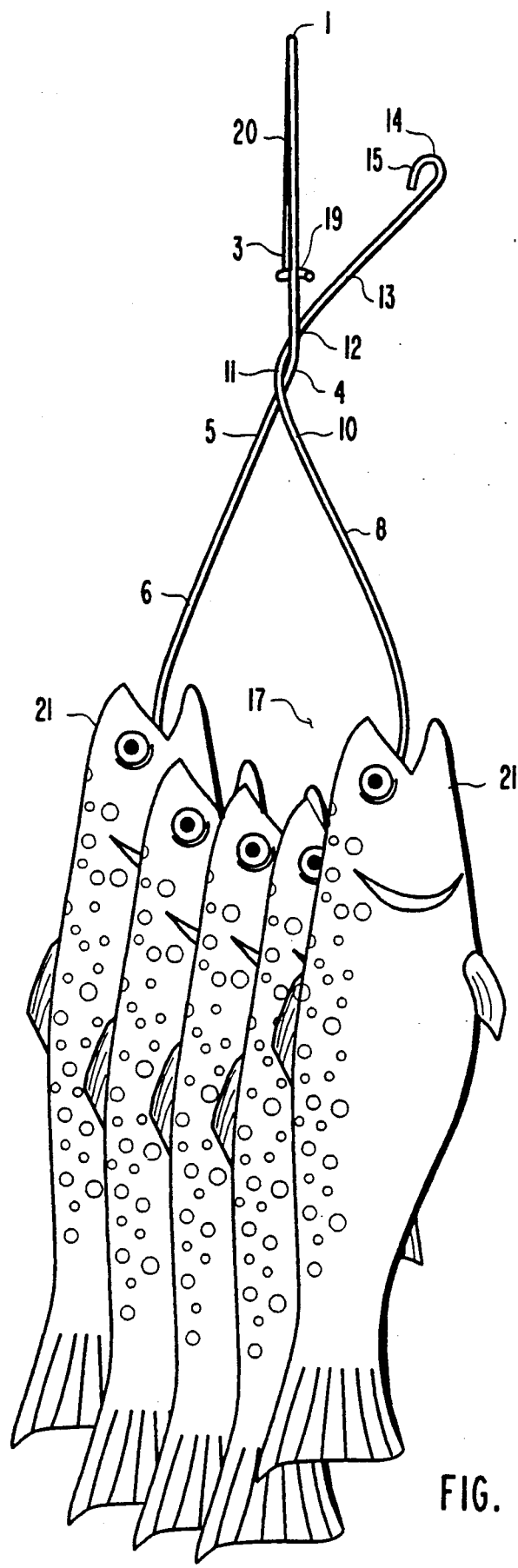
FIG. 7. is a front elevation showing a progressive pictorial representation relating to FIGS. 4, 5 and 6 that illustrates the carrier holding several fish each following the same path to the bottom of the loop aperture shown.

As shown in FIG. 7, a progessive pictorial representation is illustrated of additional fish 21 are added to the fish stringer 18 proximate the receiver aperture 17. The sequence of the operation of the present invention starts at the fish gill receiver point 14; the point 14 goes in through the fish gill and out through the mouth, then the fish proceeds down the receiver arm 14, activating the cam loop 4 which opens the receiver neck 11 and then rocks and twists the fish around the neck 11 and down and on the receiver loop aperture 17. Each fish is appropriate placed with one hand and the design of the present invention and the force of gravity cause the action to load the fish and then spring back ready to receive the next fish automatically. The fish 21 will not become detached until the receiver neck is twisted open by the receiver arm 13 being manually urged, counter-clockwise looking down, see FIG. 1, to unhook from carrier arm 1B; then they can be easily dumped off. The carrier clasp hook 19 securely holds the carrier aperture 16 closed and is suspended securely from a belt, float tube, boat or other useable attachment. The carrier top 1 supports the catch and permits transportability of the catch from the field to such a point where the carrier can be detached and the fish dispatched.

It will be apparent from the foregoing that many other variations and modifications may be made in the structures and methods described herein, for use in a variety of load supporting functions, without departing substantially from the essential concept of the present invention. Accordingly it should be clearly understood that the forms of the invention described herein and depicted in the accompanying drawings are exemplary only and are not intended as limits in the scope of the present invention.

It should also be noted that because the present invention is designed to be made from a continuous roll of wire in an automated process jig that bends and conforms the wire to the configuration herein presented and that no further assembly or parts are required, this present invention is fast to produce and is low cost to manufacture. The production of the cam loop fish stringer is similar to its operation, simple and easy.

What is claimed:

1. A fish stringer carrier for holding and carrying fish comprising: a canted receiver arm to accept the fish in through the gills and out through the mouth and having a receiver neck, a carrier arm provided with an upper clip attachable to an external object and having a lower, depending cam loop, and a receiver loop integral with and interposed between said receiver arm at said receiver neck and said carrier arm at said depending cam loop, said receiver arm being angulated upwardly and outwardly above the horizontal and provided said receiver neck which overlaps at an acute angle and partially twists about said depending cam loop whereby fish from the force of gravity can slide down the receiver arm between and past said receiver neck and said cam loop at such overlap and onto said receiver loop with no further action from the user.

2. The fish stringer of claim 1 wherein said carrier clip comprises an openable, releasably closable locking clasp constituting a detachable carrier loop, allowing the fish stringer to be removably attached to a belt, float tube, boat, or other suitable attachment.

3. A fish stringer carrier for holding and carrying fish comprising; a canted receiver arm to accept the fish in through the gills and out through the mouth and having a receiver neck, a carrier arm provided with an upper clip attachable to an external object and having a lower, depending cam loop, and a receiver loop integral with and interposed between said receiver arm at said receiver neck and said carrier arm at said depending cam loop, said receiver arm being angulated upwardly and outwardly above the horizontal and provided said receiver neck which overlaps at an acute angle said depending cam loop whereby fish from the force of gravity can slide down the receiver arm between and past said receiver neck and said cam loop at such overlap and onto said receiver loop with no further action from the user, and wherein said receiver loop is an elliptical loop with a large rounded bottom portion where the fish rest and has an upper narrow neck at the top wherein said receiving neck and said cam loop cross at a junction and then twist around each other.

4. A one-piece fish stringer having a carrier provided with a lower cam loop; a receiver arm having a lower cambered receiver neck crossing at an acute angle over said lower cam loop, and a receiver loop for receiving and supporting fish and interposed between said cambered bend and said cam loop, whereby a fish descending upon the receiver arm hits the cam loop and the cam loop rocks and twists the fish against the receiver arm and opens a gap between the carrier at said lower cam loop and the receiver arm at said receiving neck, whereby to allow the fish to twist around said neck of the receiver and to descend down the receiver to the receiver loop wherein the fish are securely held, said stringer being sufficiently flexible to permit the manual urging of said receiver arm to a reversed position relative to said cam loop, for dumping fish from said stringer.

5. A one-piece, wire-formed, resilient load supporting device having an essentially vertical, upstanding carrier arm provided with attachment means for attaching to an external object, and an upwardly slanted receiver arm crossing at a juncture area said carrier arm and provided with a protective rounded tip, a receiver loop depending from and joining said carrier arm and receiver arm, said receiver arm bending in camber about said carrier arm proximate said juncture area in a manner whereby to permit objects descending upon said receiver arm to proceed through and open said juncture, for descent onto and supportive retention by said receiver loop.

* * * * *